O. E. RUHOFF.
DRY CELL CONSTRUCTION.
APPLICATION FILED NOV. 14, 1918.
1,432,417.
Patented Oct. 17, 1922.
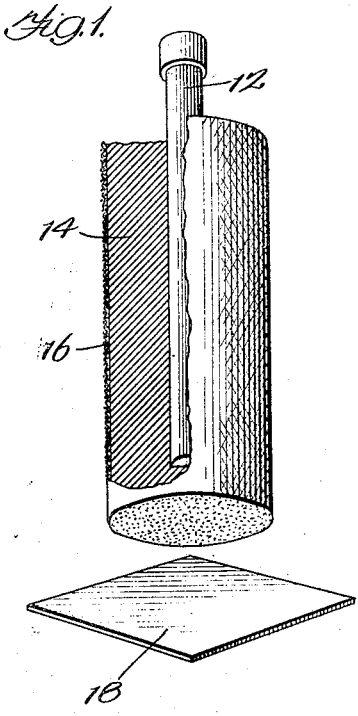
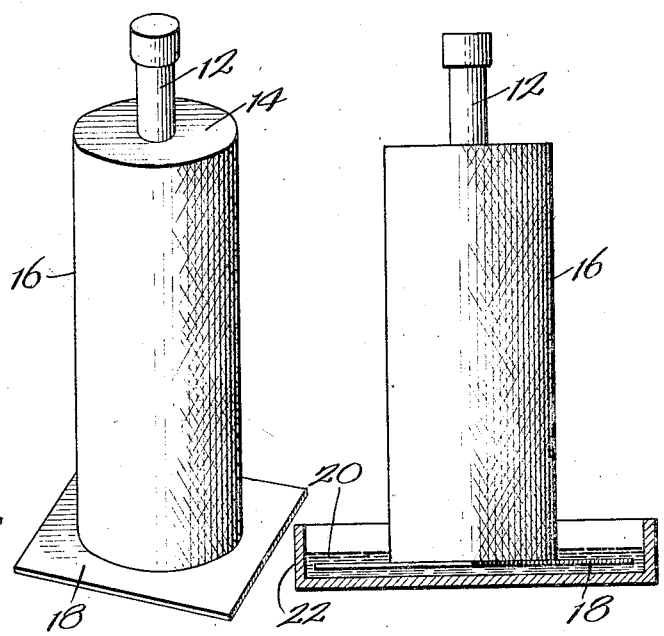
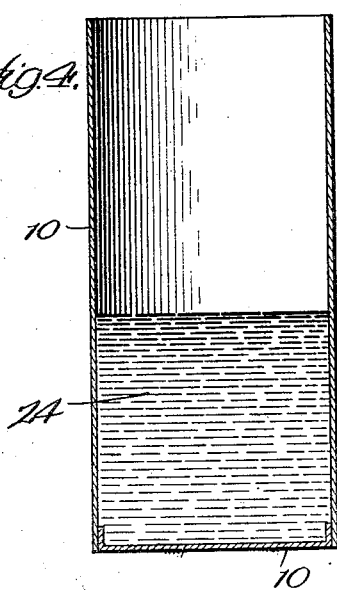
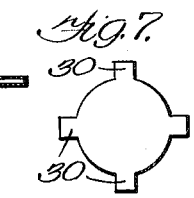
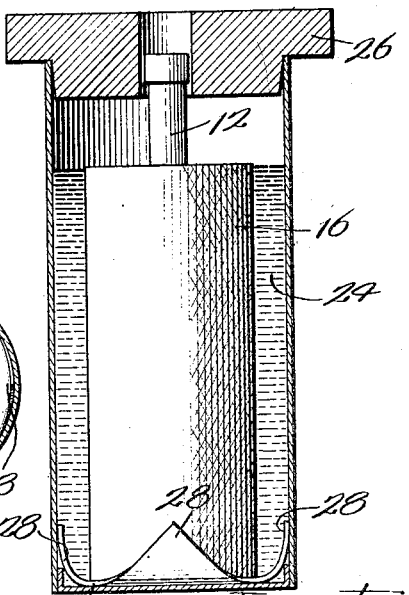
Inventor:
Otto E. Ruhoff
By Cheever & Cox Attys Patented Oct. 17, 1922.

1,432,417

UNITED STATES PATENT OFFICE.

OTTO E. RUHOFF, OF MADISON, WISCONSIN, ASSIGNOR TO FRENCH BATTERY & CARBON CO., OF MADISON, WISCONSIN, A CORPORATION OF WISCONSIN.

DRY-CELL CONSTRUCTION.

Application filed November 14, 1918. Serial No. 262,416.

*To all whom it may concern:*

Be it known that I, OTTO E. RUHOFF, a citizen of the United States, residing at Madison, in the county of Dane and State of Wisconsin, have invented a certain new and useful Improvement in Dry-Cell Construction, of which the following is a specification.

This invention relates to dry batteries. As is well understood in the art, such a battery is ordinarily composed of a core or bobbin consisting of a carbon pencil with depolarizing material compressed around it, said core or bobbin being inserted in approximately the center of a zinc can which forms one pole of the battery, the intervening space between the core or bobbin being then filled with an electrolyte which is usually initially a liquid when the battery is formed but shortly thereafter is made gelatinous thereby making the battery a dry cell.

The object of the invention is to provide a novel means and method of constructing such a dry battery to insure easy and rapid construction of the battery without danger of short-circuiting the battery by contact between the core and the zinc while the battery is being made, this object being especially desirable when the core or bobbin is not wrapped in the customary cheese cloth or similar material, which cheese cloth can be omitted in modern construction when certain parts of the battery are chemically constituted in a certain way, which forms no part of this invention and is therefore not referred to in detail. The invention consists in means for attaining the foregoing objects, which can be easily and cheaply made and used, which is satisfactory in operation and is not readily liable to get out of order. More in detail, the invention consists in the improved process and in features and details of construction which will be hereafter more fully set forth in the specification and claims.

Referring to the drawings, in which similar numerals indicate the same parts throughout the several views, Figures 1 to 5 inclusive illustrate the essential elements of a battery and the essential steps followed in carrying out this invention in ultimately producing the finished battery of Figure 5.

Figure 6 is a sectional plan view transversely of the finished battery illustrating the means by which the core is held separate from the zinc.

Figure 7 is a modified form of separator.

In carrying out this invention, the operator provides himself with the zinc can 10, common to the art, shown in Figures 4 and 5, the core or bobbin consisting of the carbon pencil 12 and the depolarizing material 14 thereon, whether held in place by the cloth 16 of Figure 1, or otherwise, and with a separator member 18 which, in the case here illustrated, takes the form of a rectangular piece of paper, the distance across whose diagonal corners is greater than the diameter of the can 10.

The operator now applies a small quantity of suitable adhesive to the bottom of the core and places the core upon the separator member 18 in the position shown in Figure 2, and presses the two together so that they will adhere one to the other. The core with the separator adhering to it, as shown in Figure 2, is now preferably immersed in a small quantity of paraffine 20 in a suitable retaining dish 22 provided for the purpose, so as to sufficiently coat the separator member 18 with paraffine so that it will act as an insulator between the bottom of the core 14 and the bottom of the can 10. This coating of the separator member 18 with paraffine may be applied with a brush instead of immersion, as described, without departing from this invention. If the separator member 18 is itself made of insulating material the coating with paraffine is unnecessary and may be omitted without departing from the spirit of this invention.

The operator now takes hold of the core 12—14 and places it in the position shown in Figure 4, and then lowers it to the position shown in Figure 5, in which it appears immersed in the electrolyte material 24. The best practice is to place this electrolyte 24 in the cell before the core is lowered, but the electrolyte may be poured in afterwards without departing from the invention. As soon as the core reaches the position of Figure 5, a temporary retaining or spacing cover 26 of insulating material is preferably placed over the top of the zinc can 10 and the core to retain them in fixed relation with reference to each other until the electrolyte 24 has time to become gelatinous, whereupon the member 26 is removed and the top of the battery finished off in the ordinary manner well known in the art.

Owing to the use of the construction specified, the corners 28 of the separator 18 turn up, as shown in Figure 5 sufficiently so that they bear quite strongly against the interior wall of the can 10 and thus hold the core separate from and clear of the can 10, thus preventing short-circuiting during the process of inserting the core and while the electrolyte is becoming gelatinous.

In the preferred form of construction shown in the first six figures of the drawing, this separator member 18 is made of rectangular form, as heretofore described. It may, however, assume any other form, as for instance that shown in Figure 7, so long as the main body of the separator has projecting members 30 which take the place of the corners 28, heretofore referred to, and serve to hold the core away from the can.

The depolarizing mixture of the core usually comprises manganese dioxid, carbonaceous material, sal ammoniac and sufficient water for compacting purposes. Where the cheese-cloth covering is omitted, some binder ingredient of a sticky or cementitious character may be introduced before the compacting operation, if desired. A boiled mixture of flour and water would serve, or a boiled solution of sal ammoniac and zinc chlorid containing a small percentage of starch in gelantinized condition, affording a syrupy, or gelatinous liquid, may be employed for moistening the materials of the depolarizing mixture, previous to the compacting or forming operation.

The invention renders thoroughly practicable the use of a naked, or unwrapped core. This core can be introduced into the can in the manner set forth without danger of disintegration and without danger of short-circuiting the cell. Thus, the cost of manufacturing cells can be reduced, which is a matter of prime importance in an article which is used in very large numbers. A further advantage of this type of construction is that air is not trapped between the core and can and the electrolyte can establish contact at all points with the peripheral surfaces of core and can. Also, the internal resistance of the cell is somewhat lessened.

Having thus described my invention, what I claim as new and desire to secure by Letters Patent, is:—

1. The combination with a can affording one electrode, of a naked core of depolarizing material having a separator member attached to its bottom and projecting beyond the periphery thereof, said separator member being adapted to hold the core away from the can during the operation of insertion, and serving to separate the core from the can.

2. The combination of a zinc can, a naked depolarizing core having cemented to its bottom a disk which is provided with flexible projections extending beyond the periphery and serving to engage the peripheral wall of the can and hold the core centered during insertion, said projections being of a nature to permit previously introduced electrolyte to rise and fill the annular space as the electrolyte is displaced in the operation of inserting the core.

3. The combination of a zinc can, a naked core of depolarizing material having a spacing disk secured to the lower portion thereof, said disk having projections extending beyond the core and spacing the core with relation to the circumferential wall of the can, and electrolyte in the annular space between core and can and making direct contact with the naked core.

4. The method of manufacturing a dry cell, which comprises: forming a core of depolarizing material and securing to the lower surface of the naked core a disk having projections, and inserting the core in the can while utilizing said disk as a centering device during such insertion.

5. The method of manufacturing a dry cell, which comprises: forming a core of depolarizing material and securing to the lower surface of the naked core a spacing member, and introducing the naked core and electrolyte into a can, said spacing member being utilized during the insertion of the core as a centering device.

6. The method of manufacturing a dry cell, which comprises: pouring a quantity of electrolyte into a zinc can; forming a core of depolarizing material and securing to the lower portion of the naked core a spacing member; and inserting the core into the can and causing displacement of the electrolyte, while utilizing said spacing member as a centering device during such insertion.

7. The method of manufacturing a dry cell, which comprises: pouring a quantity of electrolyte into a zinc can; forming a core of depolarizing material and securing to the lower portion thereof a spacing member having projections extending beyond the core; and inserting the core in naked condition into the can and causing displacement of the electrolyte, while utilizing said spacing member as a centering device during such insertion.

In witness whereof, I have hereunto subscribed my name in the presence of two witnesses.

OTTO E. RUHOFF.

Witnesses:
  Dwight B. Cheever,
  M. S. Rosenzweig.